UNITED STATES PATENT OFFICE.

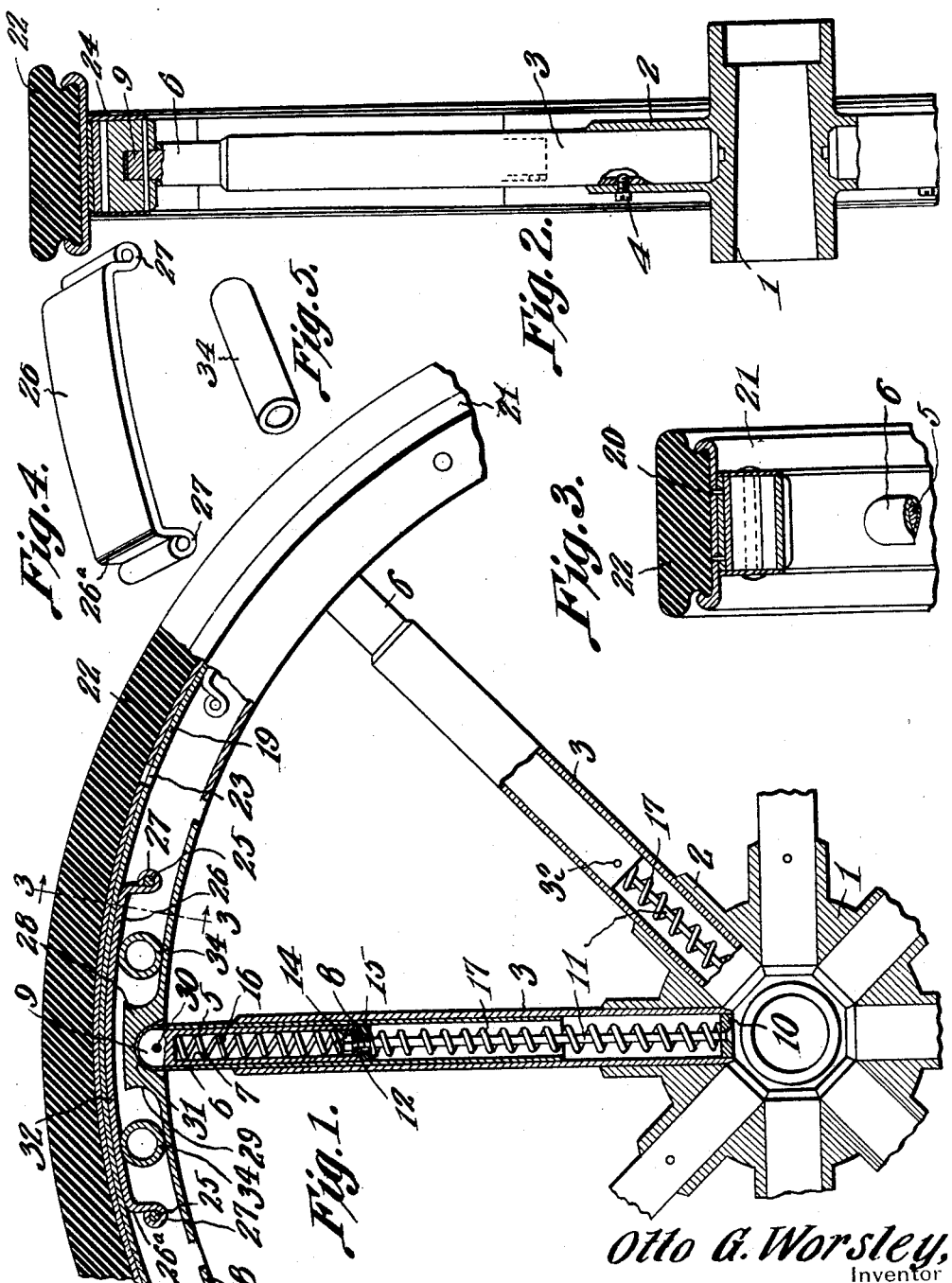

OTTO G. WORSLEY, OF AURORA, ILLINOIS.

SPRING-WHEEL.

1,113,177.     Specification of Letters Patent.     Patented Oct. 6, 1914.

Application filed February 3, 1914. Serial No. 816,258.

*To all whom it may concern:*

Be it known that I, OTTO G. WORSLEY, a citizen of the United States, residing at Aurora, in the county of Kane and State of Illinois, have invented a new and useful Spring-Wheel, of which the following is a specification.

The device forming the subject matter of this application is a spring wheel, and one object of the invention is to improve the resilient spoke construction which forms an operative connection between the hub and the rim.

Another object of the invention is to provide anti-friction means of a novel form, for supporting portions of the rim for limited relative movement.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing: Figure 1 shows in sectional side elevation, a portion of a wheel constructed in accordance with the present invention; Fig. 2 is a transverse section of the structure shown in Fig. 1; Fig. 3 is a section on the line 3—3 of Fig. 1; Fig. 4 is a perspective of the combined stop plate and wear member; Fig. 5 is a perspective view illustrating one of the anti-friction elements.

In the accompanying drawings, the numeral 1 indicates the hub of a wheel, provided with spoke sockets 2. Each spoke socket 2 receives a tubular main spoke member 3, and, as clearly shown in Fig. 2, a screw 4 or like connecting element passes through the spoke socket 2 and enters the spoke member 3 to hold the latter in place.

Slidably mounted for telescoping movement within the main tubular spoke member 3 is an auxiliary tubular spoke member 5. This auxiliary tubular spoke member 5 is a composite structure and comprises an outer tube 6 and an inner tube 7. The inner tube 7 is considerably shorter than the outer tube 6 so that within the contour of the auxiliary tubular spoke member 5, considered generally, and between the inner and outer ends thereof there is formed a shoulder 8. The auxiliary tubular spoke 6 is closed at its outer end, as indicated at member 5.

Secured in the inner end of the main tubular spoke member 3 is a foot plate 10 in which is secured the inner end of a rod 11. A primary abutment 12 is threaded on the rod 11 adjacent its outer end, the primary abutment 12 being held in place, for adjustment, by means of a nut 14. The primary abutment 12 is mounted to slide within the auxiliary tubular spoke member 5, or more specifically within the inner tube portion 7 of the auxiliary spoke member. A secondary abutment 15 is mounted to slide on the rod 11 within the contour of the outer tube portion 6 of the auxiliary spoke member 5 and bears against the inner end of the inner tube portion 7 of the auxiliary spoke member. A compression spring 16 abuts against the outer end 9 of the auxiliary spoke member 5 and is engaged by the abutment 12. A compression spring 17 abuts against the foot plate 10 and the outer end of the spring and is received by the abutment 15.

The felly portion of the wheel is fashioned in sections and comprises an inner sectional part or member 18 and an outer part or member 19, the outer part or member 19 being connected by means of rivets 20 or the like to a main rim 21 which may be of any desired construction, the same in the present instance being shown as supporting a solid tire 22. The form of the tire 22, however, is immaterial and in order that an inflatable tire may be employed, the outer part 19 is equipped with an opening 23 adapted to receive the valve tube. Side plates 24 are shown, the same being connected by securing elements 25. These securing elements 25 pass through eyes 27 formed upon the inwardly projecting ends 26ᵃ of a combined wear plate and stop member 26 which abuts against the outer part 19 of the felly. The elements of the inner sectional member 18 of the felly are equipped with lugs or equivalents 28 lying between the ends 26ª of the stop member 26. The lug 28 is provided in its ends with recesses 29 forming stops adjacent the outer part 19 of the felly. Anti-friction elements which may be rollers 34 are arranged between and bear upon the inner felly elements 18 and upon the combined stop member and wear plate 26, these anti-friction elements having a limited movement between the stops formed by the extremities of the lug 28 and the inwardly projecting end portions 26ª of the stop member 26. A pivot element 30 passes through the end portion 9 of the auxiliary spoke 5 and is received in the lug 28, the lug 28 having a concavity 31 which receives the outer end portion 9 of the spoke.

In practical operation, the main rim 21, the side plates 24 and the stop member 26 have a limited circumferential movement independently of the inner part 18. The anti-friction elements 34 serve to support these relatively movable parts of the structure and the circumferential movement thereof is limited by the coöperation between the anti-friction elements 34, the end portions 26ª of the stop member 26 and the lug 28.

The spring 17 is considerably heavier than the spring 16 and the spring 17 is normally held under compression by adjusting the nut 14. Under normal working conditions, the spring 17 supports the major portion of the load, but when an obstacle of any sort is encountered, putting a sudden strain upon the structure, the spring 16 is brought into play, the abutment 12 which is fixed upon the rod 11 sliding within the inner part 7 of the auxiliary spoke member 5. It is to be observed that owing to the presence of the rod 11 and the nuts 14, together with the respective abutments 12 and 15, the springs do not work against each other. By manipulating the nuts 14 it is possible to put all of the springs 17 under the same degree of compression and the continuity of the periphery of the wheel may thus be secured. The screw 4 may be removed from the spoke socket 2 and into the interior of the telescoping spoke, considered generally, may be introduced a lubricant, which preferably is in the form of a stiff grease.

It is possible to push all of the auxiliary spoke members 5 inwardly with the respectively attached inner felly elements and to hold the springs under compression while the felly is being mounted in place, and with this end in view, the outer tube 6 of the auxiliary spoke member 5 is provided adjacent its inner end, as clearly shown in Fig. 1, with an opening 33 in which the end of the screw 4 may be engaged thus to hold the spokes 5 and 3 in telescoped relation and to hold the springs under compression.

Having thus described the invention, what I claim is:—

1. In a spring wheel, a hub; a rim; a main tubular spoke member secured to the hub; an auxiliary tubular spoke member connected with the rim and slidable within the main spoke member; a rod located within the main spoke member and held against longitudinal movement; an abutment adjustable along the rod and fitted within the auxiliary tubular spoke member; means for holding the abutment fixed in adjusted positions; an abutment slidable on the rod toward and away from the hub bearing against the auxiliary spoke member and adapted to engage the adjustable abutment to limit the outward movement of the movable abutment; a compression spring located within the auxiliary spoke member and engaging the adjustably fixed abutment; and a spring located within the main spoke member and engaging the movable abutment.

2. In a spring wheel, a rim comprising inner and outer members, the inner member being sectional and each element thereof having a lug; side plates coöperating with the inner and outer elements; securing means uniting the side plates; a combined stop member and wear plate for each element of the inner rim member, and having end portions engaging said securing means; anti-friction elements engaging each wear plate and located between the same and the corresponding element of the inner rim member upon the opposite side of the lug on the latter and between the same and the end portions of the combined stop member and wear plate, to limit circumferential movement of said anti-friction elements; a yieldable spoke connected with each element of the inner rim member and a hub to which the inner ends of the spokes are attached.

3. In a spring wheel, a rim, comprising inner and outer members, the inner member being sectional and each element thereof having a lug; a combined wear plate and stop member for each element of the inner rim member bearing against the outer member of the rim and provided with inwardly projecting end portions forming stops located on opposite sides of the lug of the corresponding rim element: anti-friction elements located between each stop and wear plate and corresponding element of the inner rim member, and respectively between said lug and said stops; a hub; and a yieldable spoke forming a connection between each element of the inner rim member and hub.

4. A spring wheel having telescoping spring-extended spokes; a hollow rim having a sectional inner member, with the elements of which the outer ends of the spoke are respectively connected; loose anti-friction elements located between each element of the inner rim member and the outer rim member; and stops carried respectively by the outer rim member and each element of the inner rim member to limit the circumferential movement in both directions of said anti-friction elements.

In testimony that I claim the foregoing as my own, I have hereto affixed my signature in the presence of two witnesses.

OTTO G. WORSLEY.

Witnesses:
 SELINA WILLSON,
 I. E. SIMPSON.

Copies of this patent may be obtained for five cents each, by addressing the "Commissioner of Patents, Washington, D. C."